(12) United States Patent
Hu et al.

(10) Patent No.: US 8,472,364 B2
(45) Date of Patent: Jun. 25, 2013

(54) EVOLVED MULTIMEDIA BROADCAST/MULTICAST SERVICE BASE STATION, USER EQUIPMENT AND METHODS THEREOF

(75) Inventors: Zhongji Hu, Shanghai (CN); Yonggang Wang, Shanghai (CN); Yu Chen, Shanghai (CN); Pingping Xing, Shanghai (CN)

(73) Assignee: Alcatel Lucent, Paris (FR)

( * ) Notice: Subject to any disclaimer, the term of this patent is extended or adjusted under 35 U.S.C. 154(b) by 609 days.

(21) Appl. No.: 12/438,827

(22) PCT Filed: Aug. 20, 2007

(86) PCT No.: PCT/CN2007/002503
§ 371 (c)(1),
(2), (4) Date: Dec. 2, 2009

(87) PCT Pub. No.: WO2008/025239
PCT Pub. Date: Mar. 6, 2008

(65) Prior Publication Data
US 2010/0080159 A1 Apr. 1, 2010

(30) Foreign Application Priority Data
Aug. 25, 2006 (CN) .......................... 2006 1 0109941

(51) Int. Cl.
*H04H 20/71* (2008.01)
(52) U.S. Cl.
USPC ........................................................ 370/312
(58) Field of Classification Search
None
See application file for complete search history.

(56) References Cited

U.S. PATENT DOCUMENTS

| 7,096,024 B2 | 8/2006 | Sinnarajah et al. | |
|---|---|---|---|
| 7,349,711 B2 | 3/2008 | Hu et al. | |
| 2003/0088695 A1 | 5/2003 | Kwak et al. | |
| 2003/0223394 A1 | 12/2003 | Parantainen et al. | |
| 2004/0103435 A1* | 5/2004 | Yi et al. | 725/81 |
| 2004/0229626 A1 | 11/2004 | Yi et al. | |
| 2005/0041681 A1 | 2/2005 | Lee et al. | |
| 2005/0090278 A1* | 4/2005 | Jeong et al. | 455/525 |
| 2005/0147127 A1 | 7/2005 | Putcha | |
| 2006/0087994 A1 | 4/2006 | Barth et al. | |

(Continued)

FOREIGN PATENT DOCUMENTS

| CN | 1764293 A | 4/2006 |
|---|---|---|
| JP | 2005-528050 A | 9/2005 |

(Continued)

OTHER PUBLICATIONS

International Search Report.

*Primary Examiner* — John Blanton
(74) *Attorney, Agent, or Firm* — Fay Sharpe LLP

(57) ABSTRACT

The present invention provides a user equipment (UE), comprising: first receiving means for receiving on a first carrier information for determining a second carrier and a Multimedia Broadcast/Multicast Service (MBMS) notification; second receiving means for receiving Radio Bearer (RB) configuration information and MBMS scheduling information on the second carrier determined from the information; and control means for generating an MBMS scheduling template based on the received RB configuration information and MBMS scheduling information, wherein, the second receiving means receives MBMS data based on the MBMS scheduling template.

35 Claims, 10 Drawing Sheets

U.S. PATENT DOCUMENTS

| | | | |
|---|---|---|---|
| 2006/0098567 A1* | 5/2006 | Willenegger et al. | 370/206 |
| 2006/0126590 A1* | 6/2006 | Putcha et al. | 370/343 |
| 2006/0154680 A1* | 7/2006 | Kroth et al. | 455/515 |
| 2006/0203756 A1* | 9/2006 | Hu | 370/312 |
| 2007/0086437 A1* | 4/2007 | DiFazio et al. | 370/352 |
| 2009/0116418 A1* | 5/2009 | Lee et al. | 370/312 |
| 2009/0137258 A1* | 5/2009 | Nguyen | 455/466 |

FOREIGN PATENT DOCUMENTS

| | | |
|---|---|---|
| JP | 2006-512875 A | 4/2006 |
| JP | 2006-516870 | 7/2006 |
| WO | WO 2005/067493 A2 | 7/2005 |
| WO | WO 2005/101736 A1 | 10/2005 |
| WO | WO 2006/088301 A1 | 8/2006 |

* cited by examiner

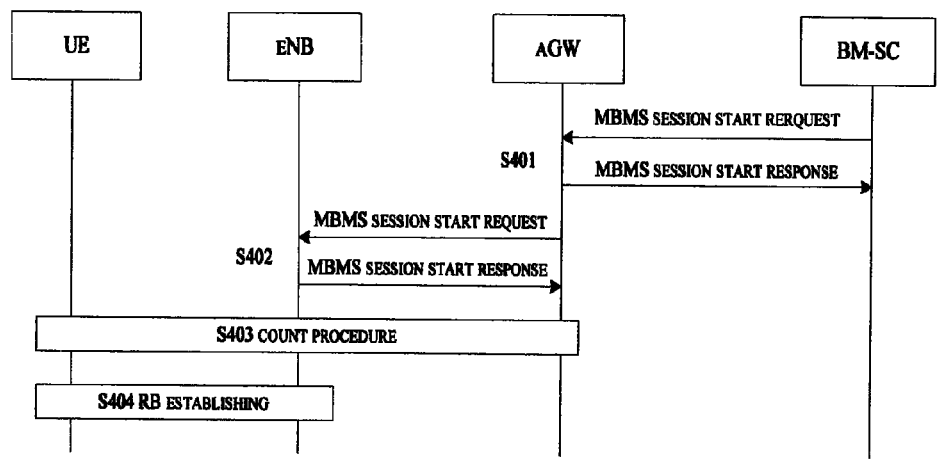
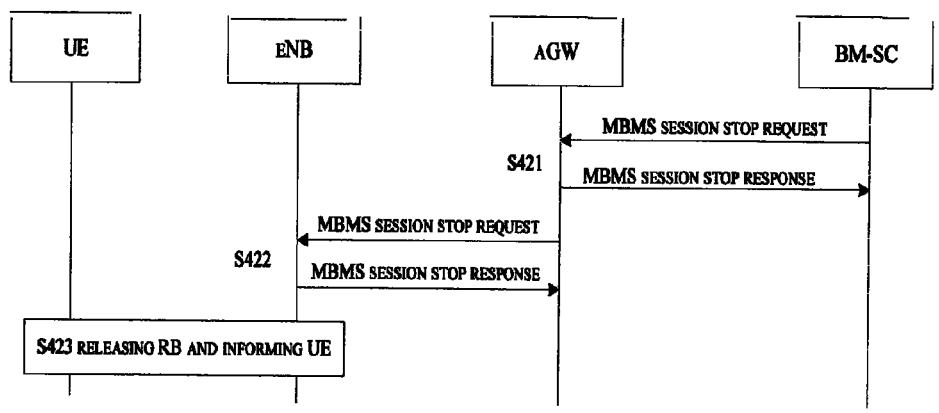

EVOLVED MULTIMEDIA BROADCAST/MULTICAST SERVICE BASE STATION, USER EQUIPMENT AND METHODS THEREOF

BACKGROUND OF THE INVENTION

1. Field of Invention

The present invention relates to the mobile communication field, especially, Long Term Evolution (LTE) in the 3G mobile communication field, and more particularly, to a base station (eNB), a user equipment (UE) and methods thereof, which support an Evolved Multimedia Broadcast/Multicast Service (EMBMS) dedicated carrier.

2. Description of Prior Art

Multimedia Broadcast/Multicast Service (MBMS) is a new function of 3GPP R6, and also is an important function in 3GPP Long Term Evolution (LTE) systems based on Orthogonal Frequency Division Multiplexing (OFDM). It is termed as E-MBMS (Evolved-MBMS) in LTE, and is termed in general as MBMS in the present invention.

In future mobile network planning, since MBMS services will occupy a large amount of radio resources, it is common for MBMS to use a dedicated carrier in order to save the radio resources. This means that only MBMS services, rather than non-MBMS services, will be supported on the MBMS dedicated carrier.

There is no dedicated carrier scheme in 3GPP R6. Before initiation of an MBMS service, UTRAN (Universal Terrestrial Radio Access Network) adopts the FLC (Frequency Layer Convergence) technique, so that a UE (User Equipment) which is interested in the MBMS service will reselect an MBMS dedicated carrier. After the MBMS service is completed, UTRAN adopts the FLD (Frequency Layer Dispersion) technique, so that the network transmits instruction information of frequency layer dispersion and the UE disperses to another carrier (that is, a normal carrier, which supports non-MBMS services) based on the instruction information. As shown in FIG. 1B, (1) a UE originally camps on normal carrier 1, and an RNC issues an FLC instruction to the UE after initiation of an MBMS service; (2) the UE selects carrier 2 on which the MBMS service locates to receive the MBMS service; (3) after the MBMS service is completed, the RNC issues a FLD instruction to the UE on carrier 2; and (4) the UE reselects carrier 1.

Based on techniques in existing protocols, MBMS services can converge onto a certain carrier. However, there are some problems. If a non-MBMS service is to be initiated, one way is to reselect a non-MBMS carrier to provide the service, even if the service is some simple operations such as location region updating and receiving or transmitting of short messages. In this way, MBMS data is likely to be lost. Another way is to provide the service on the carrier on which the MBMS locates. This has the disadvantage that only limited non-MBMS services can be provided because the capacity of the carrier on which the MBMS locates is limited. Further, the coverage area of this carrier cannot be very large, even if the downlink transmission power is increased. This is because the uplink transmission power of UEs is limited. Thus, it cannot support large cell. In addition, MBMS services and non-MBMS services are transmitted in mixture on this carrier.

Further, in existing protocols, carriers are allocated in pair for uplink and downlink (as shown in FIG. 1A). However, an MBMS service only needs downlink data transmission. In other words, the uplink carrier is wasted.

Therefore, such technique has the following defects.

(1) Since MBMS services and non-MBMS services are mixed on the so-called dedicated carrier, the uplink is limited, and thus the coverage area of this carrier cannot be very large even if the downlink transmission power is increased;

(2) Switching and reselecting between different carriers are complex; and (3) It is necessary to use carries in pairs.

Therefore, there is a need for a system and a method supporting an EMBMS dedicated carrier, which enable to simplify the system architecture and to meet MBMS performance requirements. Further, MBMS uses a dedicated carrier. As a result, the carrier carrying MBMS services is able to use a higher transmission power and thus has a larger coverage, leading to a lower deployment cost of the network.

SUMMARY OF THE INVENTION

It is an object of the present invention to provide a system and a method supporting an Evolved Multimedia Broadcast/Multicast Service (EMBMS) dedicated carrier, which enable to simplify the system architecture and to meet MBMS performance requirements. Further, MBMS uses a dedicated carrier. As a result, the carrier carrying MBMS services is able to use a higher transmission power and thus has a larger coverage, leading to a lower deployment cost of the network.

According to a first aspect of the invention, there is provided a user equipment (UE), comprising: first receiving means for receiving on a first carrier information for determining a second carrier and a Multimedia Broadcast/Multicast Service (MBMS) notification; second receiving means for receiving Radio Bearer (RB) configuration information and MBMS scheduling information on the second carrier determined from the information; and control means for generating an MBMS scheduling template based on the received RB configuration information and MBMS scheduling information, wherein, the second receiving means receives MBMS data based on the MBMS scheduling template.

According to a second aspect of the invention, there is provided a user equipment (UE), comprising: receiving means for receiving on a first carrier information for determining a second carrier and a Multimedia Broadcast/Multicast Service (MBMS) notification and for receiving on the second carrier Radio Bearer (RB) configuration information and MBMS scheduling information; and control means for generating an MBMS scheduling template based on the received RB configuration information and MBMS scheduling information, wherein, the receiving means receives MBMS data only on the second carrier based on the MBMS scheduling template.

According to a third aspect of the invention, there is provided a method of receiving data for a User Equipment (UE), comprising: receiving on a first carrier information for determining a second carrier and a Multimedia Broadcast/Multicast Service (MBMS) notification; receiving Radio Bearer (RB) configuration information and MBMS scheduling information on the second carrier determined from the information, to generate an MBMS scheduling template; and receiving MBMS data only on the second carrier based on the MBMS scheduling template.

According to a fourth aspect of the invention, there is provided a user equipment (UE), comprising: first receiving means for receiving on a first carrier information for determining a second carrier; second receiving means for receiving a Multimedia Broadcast/Multicast Service (MBMS) notification, Radio Bearer (RB) configuration information and MBMS scheduling information on the second carrier; and control means for generating an MBMS scheduling template based on the received RB configuration information and MBMS scheduling information, wherein, the second receiving means receives MBMS data based on the MBMS scheduling template.

According to a fifth aspect of the invention, there is provided a user equipment (UE), comprising: receiving means for receiving on a first carrier information for determining a second carrier and for receiving on the second carrier a Multimedia Broadcast/Multicast Service (MBMS) notification, Radio Bearer (RB) configuration information and MBMS scheduling information; and control means for generating an MBMS scheduling template based on the received RB configuration information and MBMS scheduling information, wherein, the receiving means receives MBMS data only on the second carrier based on the MBMS scheduling template.

According to a sixth aspect of the invention, there is provided a method of receiving data for a User Equipment (UE), comprising: receiving on a first carrier information for determining a second carrier; receiving a Multimedia Broadcast/Multicast Service (MBMS) notification, Radio Bearer (RB) configuration information and MBMS scheduling information on the second carrier determined from the information, to generate an MBMS scheduling template; and receiving MBMS data only on the second carrier based on the MBMS scheduling template.

According to a seventh aspect of the invention, there is provided a base station, comprising: first transmitting means for transmitting on a first carrier information for determining a second carrier and a Multimedia Broadcast/Multicast Service (MBMS) notification; and second transmitting means for transmitting an MBMS notification, Radio Bearer (RB) configuration information and MBMS scheduling information on the second carrier, wherein, the second transmitting means transmits MBMS data based on the RB configuration information and the MBMS scheduling information.

According to an eighth aspect of the invention, there is provided a base station, comprising: transmitting means for transmitting on a first carrier information for determining a second carrier and a Multimedia Broadcast/Multicast Service (MBMS) notification, and for transmitting an MBMS notification, Radio Bearer (RB) configuration information and MBMS scheduling information on the second carrier, wherein, the transmitting means transmits MBMS data only on the second carrier based on the RB configuration information and the MBMS scheduling information.

According to a ninth aspect of the invention, there is provided a method of transmitting data for a base station, comprising: transmitting on a first carrier information for determining a second carrier and a Multimedia Broadcast/Multicast Service (MBMS) notification; transmitting an MBMS notification, Radio Bearer (RB) configuration information and MBMS scheduling information on the second carrier; and transmitting MBMS data based on the RB configuration information and the MBMS scheduling information only on the second carrier.

According to a tenth aspect of the invention, there is provided a base station, comprising: transmitting means for transmitting a Multimedia Broadcast/Multicast Service (MBMS) count request to a User Equipment (UE); receiving means for receiving respective MBMS count responses to the MBMS count request from respective UEs; count result generating means for generating an MBMS count result based on the received MBMS count responses; and Radio Bearer (RB) establishing means for establishing a corresponding RB based on the MBMS count result.

According to an eleventh aspect of the invention, there is provided a method of establishing a Radio Bearer (RB) for a base station, comprising: transmitting a Multimedia Broadcast/Multicast Service (MBMS) count request to a User Equipment (UE); receiving respective MBMS count responses to the MBMS count request from respective UEs, and generating an MBMS count result; and establishing a corresponding RB based on the MBMS count result.

BRIEF DESCRIPTION OF THE DRAWINGS

Preferred embodiments of the present invention will be described in detail hereinafter with reference to attached drawings, wherein:

FIG. 4A is a time sequence chart showing a procedure of MBMS session start according to the present invention.

FIG. 4C is a time sequence chart showing an MBMS session stop procedure according to the present invention.

DETAILED DESCRIPTION OF PREFERRED EMBODIMENTS

Hereinafter, embodiments of the present invention are described with reference to the drawings. It is to be noted that the embodiments are just provided for the purpose of illumination, rather than limitation on the invention. Various numeral values provided here are not intended to limit the present invention, and may be modified by those skilled in the art as desired.

In the present invention, a dedicated carrier carrying an MBMS service only uses a non-paired downlink frequency band, without using an uplink frequency band. Thus, it is possible to increase the coverage of the MBMS service by increasing a downlink transmission power.

Further, in the present invention, a UE camps on an original non-MBMS carrier.

Figure 1A:
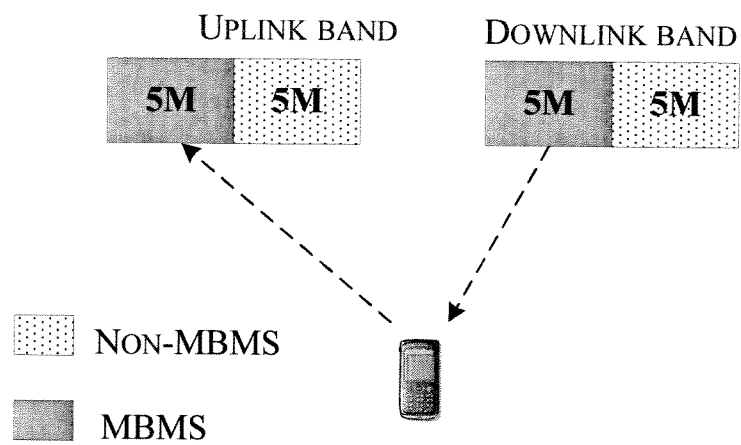
FIG. 1A is a schematic view showing uplink and downlink carriers in pair in the prior art.
Figure 1B:
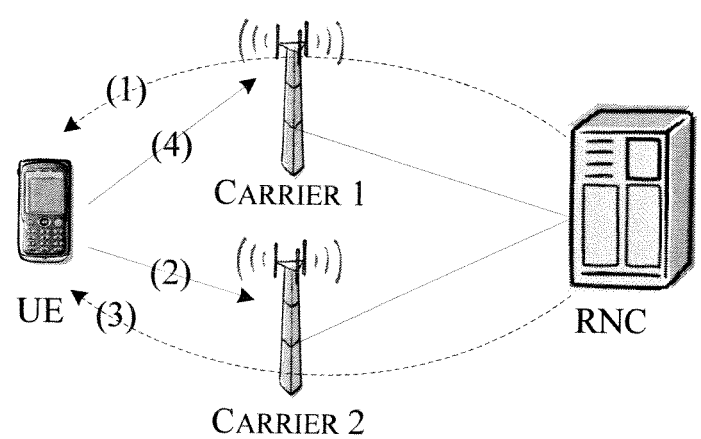
FIG. 1B is a schematic view explaining a dedicated carrier scheme based on FLC/FLD in the prior art.
Figure 2A:
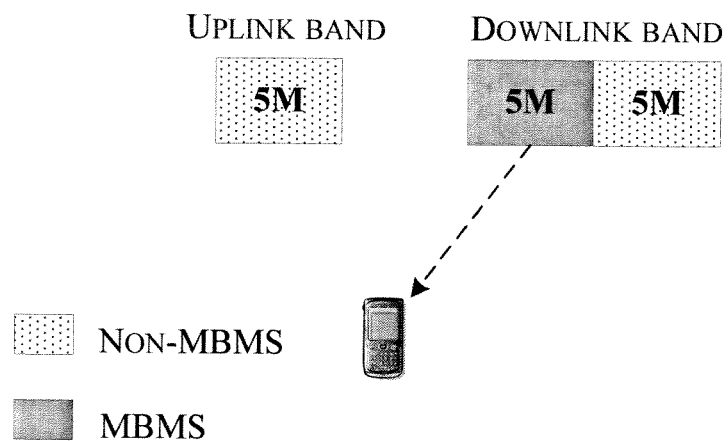
FIG. 2A is a schematic view showing a non-paired downlink carrier for carrying an MBMS service.

FIG. 2A shows a non-paired downlink carrier for carrying an MBMS service.

In the present invention, as shown in FIG. 2A, the dedicated carrier carrying the MBMS service only uses the non-paired downlink frequency band, without using an uplink frequency band. Since the transmission power of the UE is limited, it is possible to increase the coverage of the MBMS service by increasing the downlink transmission power.

Figure 2B:
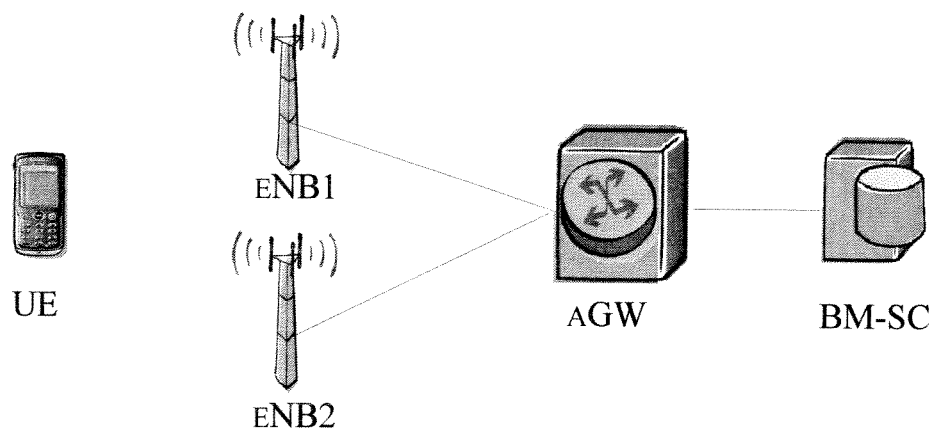
FIG. 2B is a schematic view showing an MBMS network structure under LTE architecture.

FIG. 2B is a schematic view showing an MBMS network structure under LTE architecture. Network elements supporting MBMS mainly comprise a BM-SC (Broadcast/Multicast-Service Center), an aGW (access gateway), an eNB (evolved base station), and a UE (User Equipment). The BM-SC is an entry for a content provider, and is adapted to make authorization and initiate an MBMS carrying service in PLMN, and to transmit MBMS data based on a predetermined schedule. The aGW is adapted to perform control on the MBMS carrying service for users, and to transmit the MBMS data to UTRAN. The eNB is in charge of efficiently transmitting the MBMS data to an air interface of a designated MBMS service area.

Figure 3A:
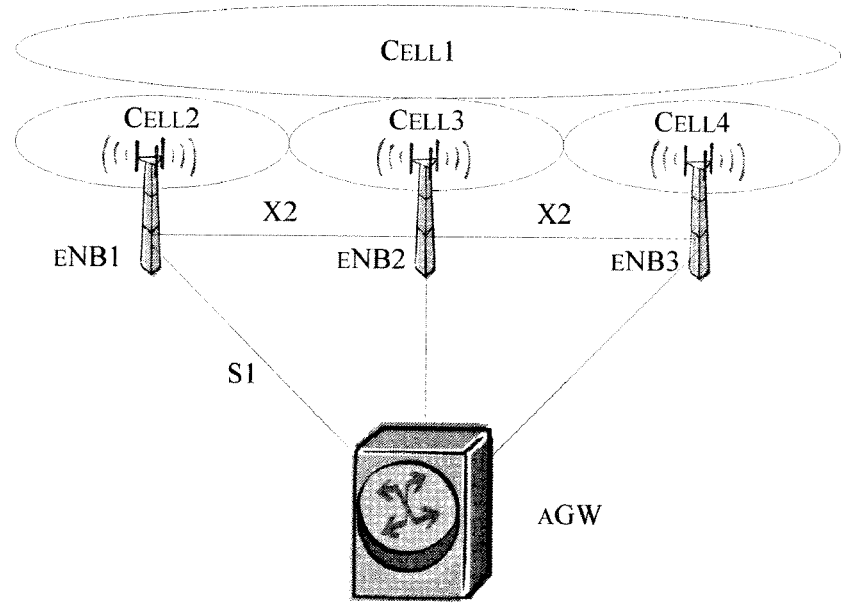
FIG. 3A is a schematic view showing a network structure supporting an MBMS dedicated carrier according to the present invention.

FIG. 3A is a schematic view showing a network structure supporting an MBMS dedicated carrier according to the present invention.

As shown in FIG. 3A, an MBMS dedicated carrier is adopted in cell 1, and non-MBMS carriers are adopted in cells 2, 3 and 4. Cells 1 and 3 may be managed by one same base station eNB2, or may be managed by separate eNBs respectively (for example, eNB1 and eNB2). An interface between an aGW and an eNB is termed as an S1 interface, and an interface between eNBs is termed as an X2 interface.

Figure 3B:
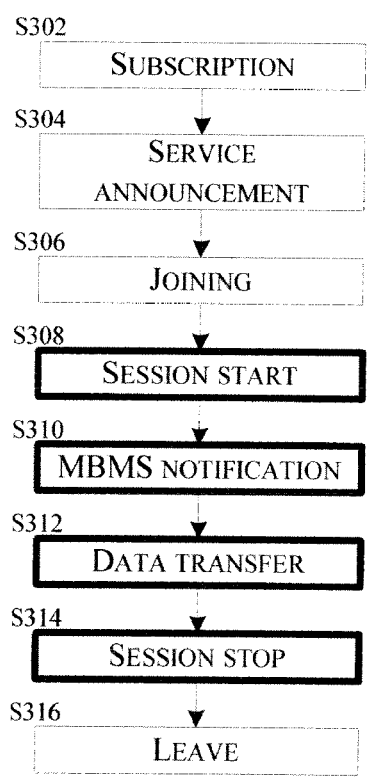
FIG. 3B is a time sequence chart showing a flow of phases of an MBMS multicast service.

FIG. 3B is a time sequence chart showing a flow of phases of an MBMS multicast service (referring to 3GPP TS 23.246):

Step S302 of subscription: establishing a relationship between users and a service provider to enable the users to receive a relevant MBMS multicast service;

Step S304 of service announcement: distributing user information of the relevant service, parameters for service activation (such as an IP multicast address) and other relevant parameters (such as a service start time);

Step S306 of joining: a procedure of a subscriber joining a multicast group;

Step S308 of session start: a procedure of a BM-SC preparing to transmit MBMS data, during which a bearer necessary for transmitting the MBMS data is established in the network through a series of signaling exchanges, and during which it may be required to count the number of users to receive the data so as to determine whether to establish the bearer and which type of bearer to be established;

Step S310 of MBMS notification: notifying a UE that MBMS multicast data are to be transmitted;

Step S312 of data transfer: transmitting the MBMS data to the UE;

Step S314 of session stop: the BM-SC initiating the session stop procedure to release service carrying resources in the network when the transfer of the MBMS data is to be completed; and Step S316 of leave: a procedure of a subscriber leaving a certain multicast group so that this user will not receive a certain MBMS service.

Among the above procedures, steps S302, S306 and S316 are done by the UE and the BM-SC in a point-to-point manner, and can be done only on a non-MBMS carrier. Step S304 may be initiated to the relevant UE by the BM-SC in a point-to-point manner, and may be done on a non-MBMS carrier. Also, this procedure may be done in a broadcast or multicast manner, and thus may be done on an MBMS dedicated carrier. Steps S302-S306 and S316 have no relation to the present invention, and thus detailed descriptions thereof are omitted here. In the following description, operations of steps S308-S314 are described in detail.

Figure 3C:
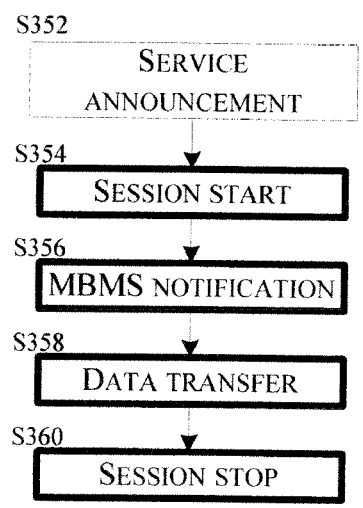
FIG. 3C is a time sequence chart showing a flow of phases of an MBMS broadcast service.

FIG. 3C is a time sequence chart showing a flow of phases of an MBMS broadcast service (referring to 3GPP TS 23.246):

Step S352 of service announcement: distributing user information of the relevant service, parameters for service activation (such as an IP multicast address) and other relevant parameters (such as a time of service initiation);

Step S354 of session start: a procedure of a BM-SC preparing to transmit MBMS data, during which a bearer necessary for transmitting the MBMS data is established in the network through a series of signaling exchanges, and during which it may be required to count the number of users to receive the data so as to determine whether to establish the bearer and which type of bearer to be established;

Step S356 of MBMS notification: notifying a UE that MBMS multicast data are to be transmitted;

Step S312 of data transfer: transmitting the MBMS data to the UE; and

Step S314 of session stop: the BM-SC initiating the session stop procedure to release service carrying resources in the network when the transfer of the MBMS data is to be completed.

Among the above procedures, step S352, like step S304, may be done by the BM-SC in a point-to-point manner or may be done in a broadcast or multicast manner, and thus may be done on an MBMS dedicated carrier or a non-MBMS carrier. Step S352 has no relation to the present invention, and thus detailed descriptions thereof are omitted here. In the following description, operations of steps S354-S360 are described in detail.

In the present invention, the processes of the session start step (S308, S354), the MBMS notification step (S310, S356), the data transfer step (S312, S358), and the session stop step (S314, S360) are quite similar for MBMS broadcast and multicast services, with just replacing "broadcast"/"multicast" with "multicast"/"broadcast". Therefore, in the following description, MBMS broadcast services and MBMS multicast services are not distinguished, and are totally termed as "MBMS services".

In the dedicated carrier system according to the present invention, MBMS services and non-MBMS services are carried on different carriers. For convenience of description, a carrier carrying an MBMS service is termed as an MBMS dedicated carrier, and a carrier carrying a non-MBMS service is termed as a non-MBMS carrier.

A UE camps on a non-MBMS carrier. On the camped carrier, the UE may initiate procedures such as calling, cell updating/location region updating, and paging receiving. MBMS dedicated carrier information, MBMS service announcement, and MBMS service notification are transmitted on the non-MBMS carrier. Further, MBMS channel configuration, MBMS scheduling, and MBMS data and the like information are transmitted on the MBMS dedicated carrier.

FIG. 4A is a time sequence chart showing a procedure of MBMS session start according to the present invention.

Figure 4B:
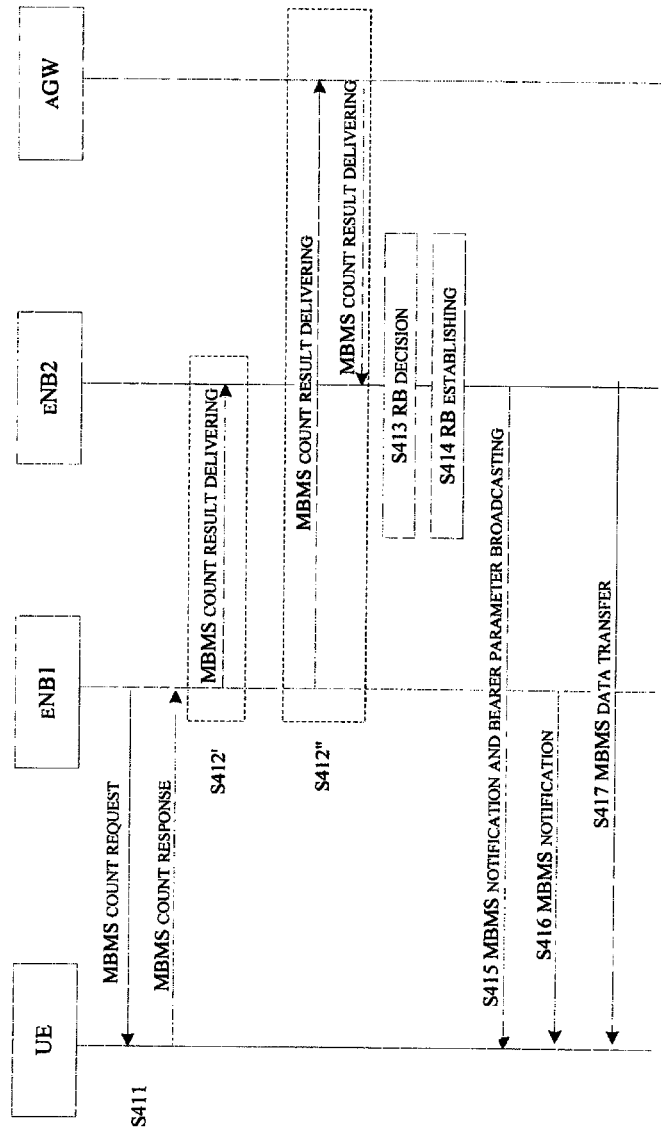
FIG. 4B shows a count procedure S403 and a radio bearer establishing procedure S404 shown in FIG. 4A and an MBMS notification procedure S310, S356 and a data transfer procedure S312, S358 shown in FIGS. 3B and 3C.

As shown in FIG. 4A, the procedure of MBMS session start comprises 4 steps of:

Step S401, exchanging of MBMS session start signaling between a BM-SC and an aGW;

Step S402, exchanging of MBMS session start signaling between the aGW and eNB(s), wherein a request for MBMS session start should be transmitted to eNB(s) to which the MBMS dedicated carrier belongs and eNB(s) to which the non-MBMs carrier belongs, and the eNB(s) all belong to the service area of this MBMS service;

Step S403, a count procedure of counting the number of users interested in this MBMS service, during which procedure, the eNB transmits a count request to UE(s) on an air interface, and receive(s) count response(s) returned by the UE(s), and determines whether to establish a radio bearer and which type of radio bearer to be established, wherein, for example, if the count result is greater than 0 then a radio bearer is to be established, and if the number of users is greater than a certain threshold then a bearer in PTM transmission mode is to be established; and whether it is necessary to carry out counting is determined by the aGW or the eNB based on radio resource management strategies, and if it is not necessary then step S403 is omitted (the count procedure will be described in detail hereinafter with reference to FIG. 4B); and Step S404, establishing, if it is necessary to establish a radio bearer for the MBMS service, a radio bearer only on the MBMS dedicated carrier.

FIG. 4B shows the count procedure S403 and the radio bearer establishing procedure S404 shown in FIG. 4A and the MBMS notification procedure S310, S356 and the data transfer procedure S312, S358 shown in FIGS. 3B and 3C.

In FIG. 4B, the count procedure S403 and the MBMS notification procedure S310, S356 are illustrated in detail, wherein eNB1 is an eNB to which the non-MBMS carrier belongs and eNB2 is an eNB to which the MBMS dedicated carrier belongs, and these two eNBs my be same or different.

At step S411, eNB1 to which the non-MBMS carrier belongs transmits an MBMS count request message, and UE(s) interested in this MBMS service return(s) an MBMS count response.

At step S412, eNB1 delivers the count result to eNB2, and the delivery of the count result may be done in the following two ways:

a) step S412', wherein eNB1 delivers the count result to eNB2 via an X2 interface; and b) step S412", wherein eNB1 first delivers the count result to the aGW via an S1 interface, and then the aGW delivers the count result to eNB2 via an S1 interface.

At step S413, eNB2 makes a radio bearer decision based on the count result to determine whether to establish a bearer and which type of bearer (for example, PTM (point-to-multipoint) bearer/PTP (point-to-point) bearer) to be established. For example, if the count result=0, there is no need to establish a radio bearer. If the count result>0, it is necessary to establish a radio bearer. If the count result>0 and the count result<a certain threshold, a PTP bearer is to be established. Further, if the count result>0 and the count result>a certain threshold, a PTM bearer is to be established. The above is just an example of the count result decision, and decision algorithms may be determined as desired. If there is no need to establish a PTP carrier, then a PTM bearer can be established only if the count result is greater than 0.

At step S414, based on the type of radio bearer to be established, eNB2 establishes a radio bearer and corresponding resources.

As step S415, eNB2 transmits an MBMS notification and configuration parameters (including channel configuration and scheduling configuration) of the relevant MBMS radio bearer, and the UE(s) prepares to receive MBMS data based on the relevant parameters.

At step S416, at the same time, eNB1 transmits an MBMS notification, without transmitting the configuration parameters of the relevant MBMS radio bearer, to inform the UE(s) on which carrier the MBMS will be transmitted. eNB1 may determine the time when to transmit the MBMS notification in the following three ways:

a) eNB2 informs the eNB1 of the time when to transmit the MBMS notification via the X2 interface;

b) eNB2 informs the aGW of the time when to transmit the MBMS notification via the S1 interface, and then the aGW forwards the time when to transmit the MBMS notification to eNB1 via the S1 interface; and c) eNB1 transmits the MBMS notification at a predetermined timing based on an interval from the session start to the MBMS data transfer.

At step S417, eNB2 receives the MBMS data from the aGW, and transmits them to the UE(s) on the MBMS dedicated carrier.

FIG. 4C is a time sequence chart showing the MBMS session stop procedure according to the present invention.

As shown in FIG. 4C, the MBMS session stop procedure comprises the following 3 steps:

Step S421, exchanging of MBMS session stop signaling between the BM-SC and the aGW;

Step S422, exchanging of MBMS session stop signaling between the aGW and the eNBs, wherein the MBMS session stop request should be transmitted to eNB2 to which the MBMS dedicated carrier belongs and eNB1 to which the non-MBMS carrier belongs, and these eNBs belong to the service area of this MBMS service;

Step S423, eNB2 releasing the resources of the radio bearer, and informing the UE(s) that this MBMS service is stopped, and eNB1 only informing the UE(s) that this MBMS service is stopped.

Next, referring to FIGS. 5A-5D, a structure and operations of a UE supporting an MBMS dedicated carrier according to the present invention are described in detail.

Figure 5A:
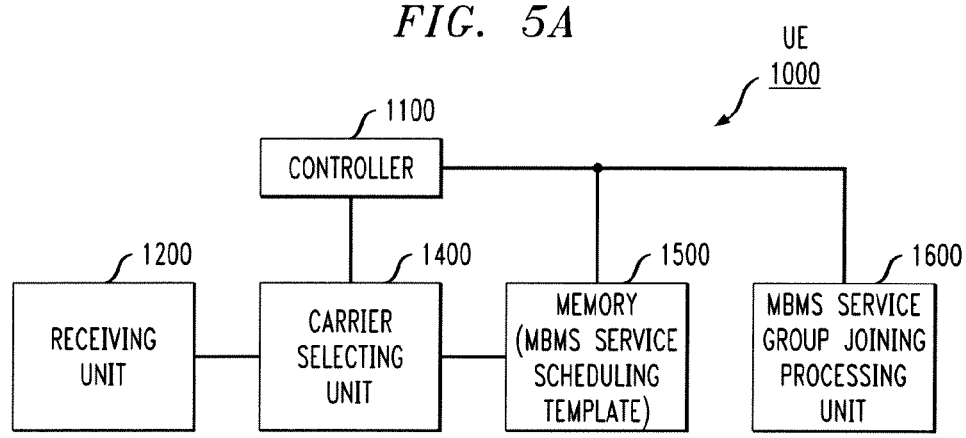
FIGS. 5A and 5B are structure block diagrams showing a UE according to the present invention.
Figure 5B:
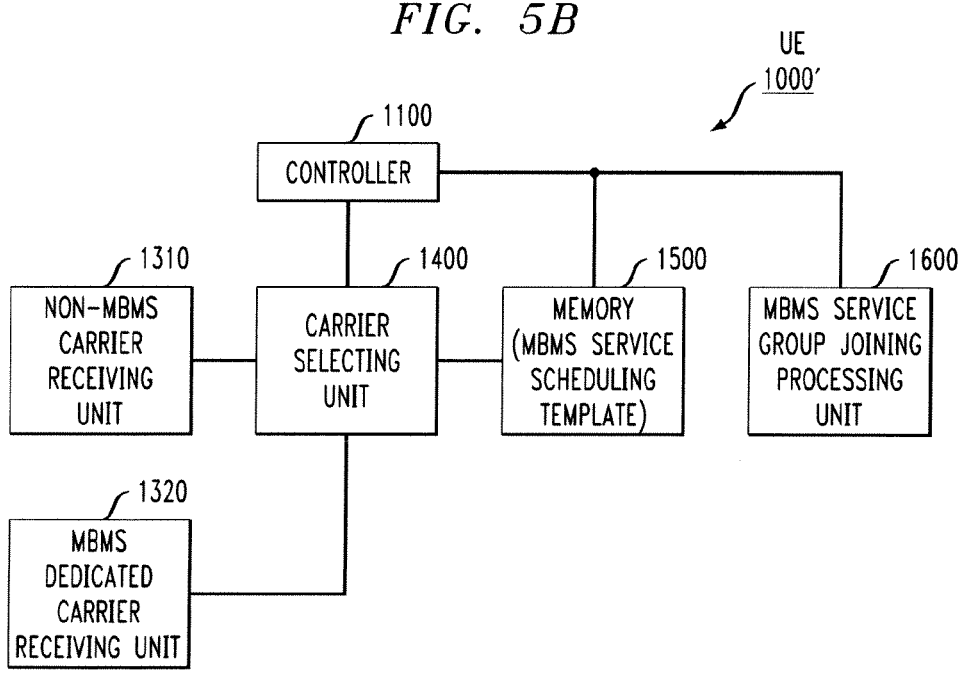

FIGS. 5A and 5B are structure block diagrams showing a UE according to the present invention.

As shown in FIG. 5A, UE 1000 according to an embodiment of the present invention comprises a controller 1100, a receiving unit 1200, a carrier selecting unit 1400, a memory 1500, and an MBMS service group join processing unit 1600.

The receiving unit 1200 switches between an MBMS dedicated carrier and a non-MBMS carrier under the control of the carrier selecting unit 1400, receives information on the MBMS dedicated carrier and the non-MBMS carrier, and delivers the information to the carrier selecting unit 1400.

The carrier selecting unit 1400 controls the receiving unit 1200 to switch between the MBMS dedicated carrier and the non-MBMS carrier based on a received MBMS notification and an MBMS service scheduling template stored in the memory 1500, and delivers the various information and data received by the receiving unit 1200 to the controller 1100.

The controller 1100 determines whether there is an interested MBMS service group based on an MBMS service announcement from the carrier selecting unit 1400, which is received by the receiving unit 1200 on the non-MBMS carrier. If there is an interested MBMS service group, the controller 1100 performs control to join the MBMS service group by means of the MBMS service group join processing unit 1600. Further, the controller 1100 generates the MBMS service scheduling template based on MBMS RB (Radio Bearer) configuration information and MBMS service scheduling information from the carrier selecting unit 1400, which are received by the receiving unit 1200 on the MBMS dedicated carrier, and stores it in the memory 1500.

The memory 1500 stores the MBMS service scheduling template.

The MBMS service group join processing unit 1600 performs operations to join the MBMS service group according to an instruction form the controller 1100.

As shown in FIG. 5B, UE 1000' according to another embodiment of the present invention comprises a controller 1100, a non-MBMS carrier receiving unit 1310, an MBMS dedicated carrier receiving unit 1320, a carrier selecting unit 1400, a memory 1500, and an MBMS service group join processing unit 1600. In this embodiment, the non-MBMS carrier receiving unit 1310 and the MBMS dedicated carrier receiving unit 1320 are provided instead of the receiving unit 1200 shown in FIG. 5A.

The non-MBMS carrier receiving unit 1310 and the MBMS dedicated carrier receiving unit 1320 receive information on the non-MBMS carrier and the MBMS dedicated carrier respectively, and deliver the information to the carrier selecting unit 1400.

The carrier selecting unit 1400 selects various information and data, which are received by the non-MBMS carrier receiving unit 1310 and the MBMS dedicated carrier receiving unit 1320 on the non-MBMS carrier and the MBMS dedicated carrier respectively, based on a received MBMS notification and an MBMS service scheduling template stored in the memory 1500, and delivers them to the controller 1100.

The controller 1100 determines whether there is an interested MBMS service group based on an MBMS service announcement from the carrier selecting unit 1400, which is received by the non-MBMS carrier receiving unit 1310 on the non-MBMS carrier. If there is an interested MBMS service group, the controller 1100 performs control to join the MBMS service group by means of the MBMS service group join processing unit 1600. Further, the controller 1100 generates the MBMS service scheduling template based on MBMS RB (Radio Bearer) configuration information and MBMS service scheduling information from the carrier selecting unit 1400, which are received by the MBMS dedicated carrier receiving unit 1320 on the MBMS dedicated carrier, and stores it in the memory 1500.

The memory 1500 stores the MBMS service scheduling template.

The MBMS service group join processing unit 1600 performs operations to join the MBMS service group according to an instruction form the controller 1100.

Figure 5C:
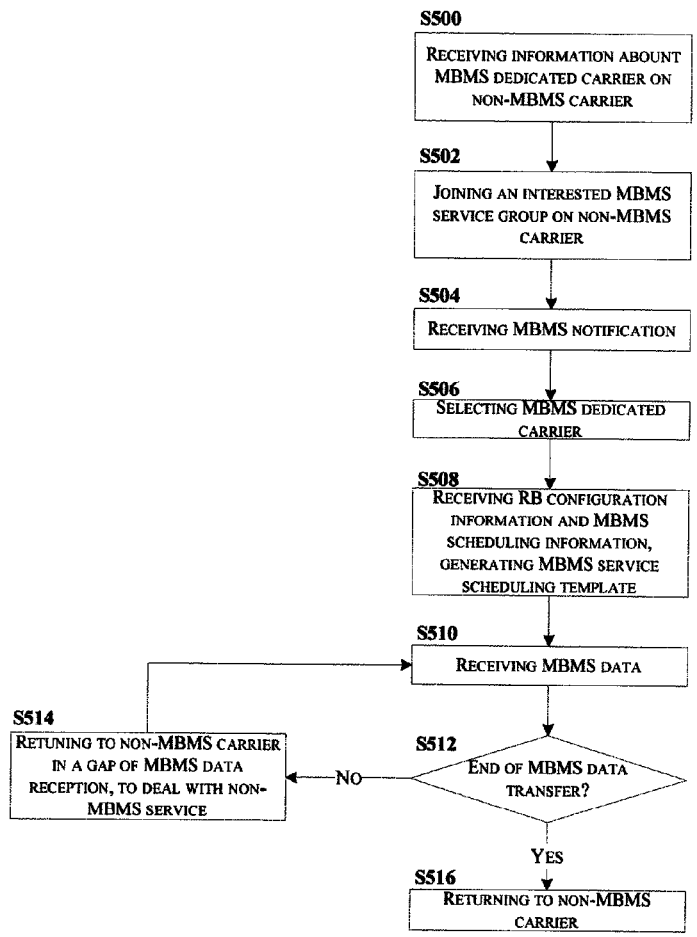
FIG. 5C is a flow chart showing operations of a UE according to the present invention.

FIG. 5C is a flow chart showing operations of a UE according to the present invention.

As shown in FIG. 5C, first, at step S500, the UE camps on a non-MBMS carrier, and receives relevant information on an MBMS dedicated carrier (including information such as frequency and bandwidth) through a broadcast channel on the non-MBMS carrier. Next, at step S502, the UE joins an interested MBMS service group based on an MBMS service announcement received on the non-MBMS carrier. Further, if the UE receives an MBMS count request, then it returns an MBMS count response indicating whether it is interested in this MBMS service or not. Of course, it is possible that an eNB does not transmit the MBMS count request, so as not to count interested UEs. When the MBMS service is to be initiated, a corresponding MBMS notification is transmitted on the non-MBMS carrier and the MBMS dedicated carrier.

When the UE receives the MBMS notification with respect to the interested MBMS service (step S504), it prepares to receive the MBMS service. At step S506, the UE selects the MBMS dedicated carrier, and at step S508, the UE receives system information, including MBMS RB configuration information and MBMS service scheduling information, on the MBMS dedicated carrier, so as to generate a scheduling template for the MBMS service to be received based on the MBMS RB configuration information and the MBMS service scheduling information. At step S510, the UE receives MBMS data at timings, on which the MBMS data are transmitted, based on the generated MBMS service scheduling template. In a gap of the MBMS data transmission, at step S512, the UE determines whether the transmission of the MBMS data is completed or not. If the transmission of the MBMS data is not completed ("No" in step S512), then at step S514, the UE returns to the camped non-MBMS carrier in the gap of the MBMS data transmission so as to deal with non-MBMS service relevant operations (such as paging receiving, location region updating), and then returns to the MBMS dedicated carrier before the transmission of next scheduled data so as to continue to receive the MBMS data (step S510). On the other hand, when the MBMS task is ended ("Yes" in step S512), at step S516 the UE returns to the camped non-MBMS carrier, and there is no longer a need to receive data on the MBMS dedicated carrier.

is For a UE with dual receivers, one receiver (1320) receives the MBMS service (on the MBMS dedicated carrier), and thus has no need to return to the non-MBMS carrier in the gap; and the other receiver (1310) camps on the non-MBMS carrier. It is the carrier selecting unit 1400 that determines data from which receiver are delivered to the controller 1100 to be processed.

Figure 5D:
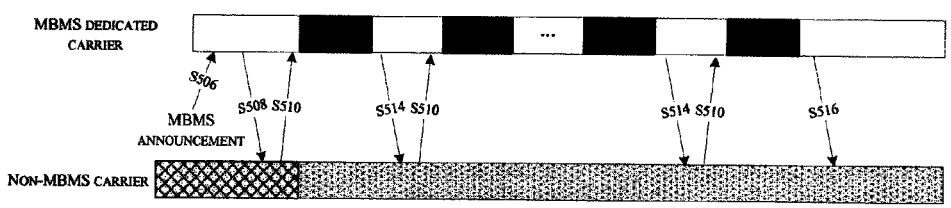
FIG. 5D is a schematic view explaining switching between an MBMS dedicated carrier and a non-MBMS carrier by a UE.

FIG. 5D is a schematic view explaining switching between the MBMS dedicated carrier and the non-MBMS carrier by the UE.

As shown in FIG. 5D, the UE switches between the MBMS dedicated carrier and the non-MBMS carrier. In conjunction with FIG. 5C, it can be known that steps S500 and S502 are performed on the non-MBMS carrier. Step S504 may be performed on one of the MBMS dedicated carrier and the non-MBMS carrier. At step S506, the UE switches to the MBMS dedicated carrier, and returns to the non-MBMS carrier after the receiving step of step S508 is completed. However, it is possible that the UE does not return to the non-MBMS carrier and holds on the MBMS dedicated carrier. Or otherwise, whether to return to the non-MBMS carrier or to hold on the MBMS dedicated carrier is determined based on the information in the generated MBMS service scheduling template. Step S510 is performed on the MBMS dedicated carrier. Step S514 is performed on the non-MBMS carrier. Steps S510-S514 are repeated until the transmission of the MBMS data is completed. Finally, at step S516, the UE returns to the non-MBMS carrier.

Next, detailed descriptions on operations of establishing a non-MBMS service by the UE when receiving MBMS data on the MBMS dedicated carrier are provided.

Figure 6:
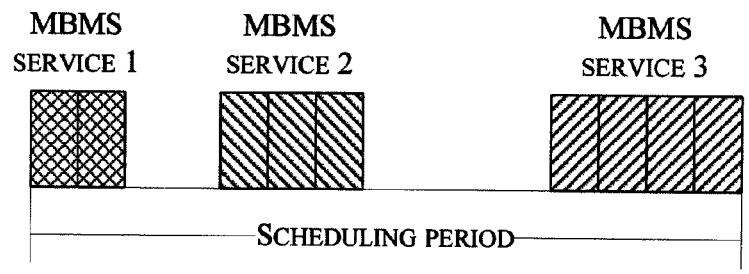
FIG. 6 shows an example of MBMS service scheduling.

FIG. 6 shows an example of MBMS service scheduling.

(1) UE Originating a Service

If it is desired to establish a non-MBMS service during reception of MBMS data on the MBMS dedicated carrier (during step S510), the UE first performs service prioritization. If the non-MBMS service is of a higher priority, the UE returns to the camped non-MBMS carrier, and initiates the non-MBMS service. When the non-MBMS service is completed, the UE continues the reception of the MBMS service. If the MBMS service is of a higher priority, then the reception of the MBMS data is continued, and the non-MBMS service is dealt with in a gap of the transmission of the MBMS data (step S514).

(2) A Service Terminated at UE

If a non-MBMS service is to be terminated at the UE, an eNB will inform this to the UE by paging. Depending on ways in which paging information is transmitted, there are two options: i) paging on the MBMS dedicated carrier and the non-MBMS carrier, and ii) paging only on the non-MBMS carrier.

i) Paging on the MBMS Dedicated Carrier and the Non-MBMS Carrier

The UE, which is receiving the MBMS service on the MBMS dedicated carrier, will perform service prioritization in case of receiving the paging. If the non-MBMS service is of a higher priority, the UE returns to the camped non-MBMS carrier, and responds to the paging on the non-MBMS carrier. If the MBMS service is of a higher priority, the reception of the MBMS data is continued, and the non-MBMS service is dealt with in a gap of the transmission of the MBMS data (step S514).

This method has an advantage that the UE will not frequently return to the camped non-MBMS carrier, resulting in power saving.

ii) Paging Only on the Non-MBMS Carrier

According to above described step S514, the UE returns to the non-MBMS carrier to receive paging in a scheduling gap.

This method has an advantage that the paging scope is reduced, and thus the capacity requirement for the paging channel is reduced. Further, the structure of the MBMS dedicated carrier is simplified.

Figure 7:
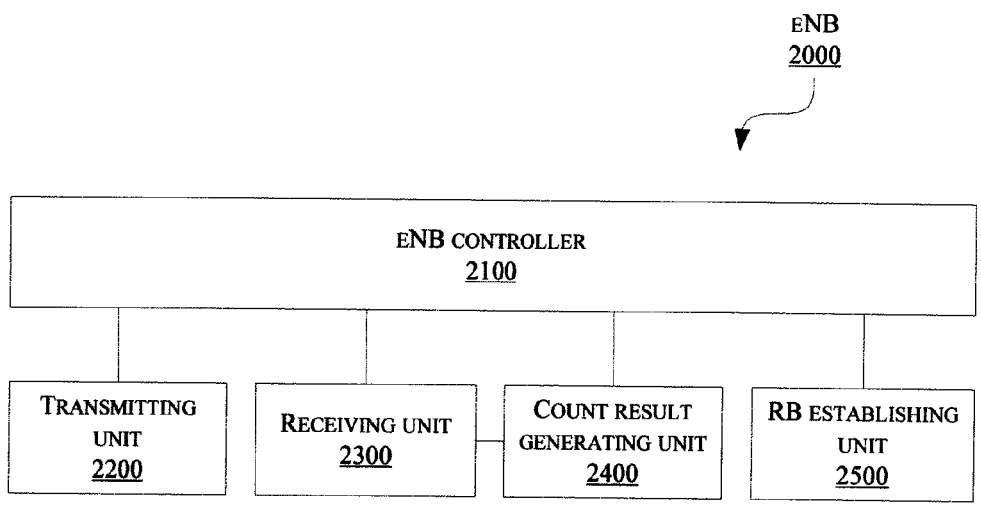
FIG. 7 is a structure block diagram showing an evolved base station eNB according to the present invention.

FIG. 7 is a structure block diagram showing an evolved base station eNB according to the present invention.

As shown in FIG. 7, the evolved base station eNB 2000 according to the present invention comprises an eNB controller 2100, a transmitting unit 2200, a receiving unit 2300, a count result generating unit 2400, and an RB establishing unit 2500.

The transmitting unit 2200 transmits various information and data, including transmitting an MBMS count request on a non-MBMS carrier, transmitting MBMS data on the non-MBMS carrier, transmitting an MBMS notification on the non-MBMS carrier, transmitting an MBMS notification, RB configuration information and MBMS service scheduling information on an MBMS dedicated carrier, and the like.

The receiving unit 2300 receives various information and data, and delivers the various information and data to the eNB controller 2100. Further, the receiving unit 2300 receives an MBMS count response from a UE, and delivers the MBMS count response to the count result generating unit 2400.

The count result generating unit 2400 generates an MBMS count result based on the MBMS count response delivered from the receiving unit 2300, especially, information included in the MBMS count response indicating whether the UE is interested in the MBMS service or not, and delivers the MBMS count result to the eNB controller 2100.

The RB establishing unit 2500 establishes a radio bearer RB meeting requirements based on an instruction from the eNB controller 2100.

The eNB controller 2100 controls operations of the above units, and determiners whether to establish an RB and which type of RB to be established based on the MBMS count result generated by the count result generating unit 2400. When it is necessary to establish an RB, the eNB controller 2100 controls the RB establishing unit 2500 to establish a corresponding RB, and controls the transmitting unit 2200 to transmit an MBMS notification on the non-MBMS carrier, and at the same time to transmit an MBMS notification, RB configuration information and MBMS service scheduling information on the MBMS dedicated carrier. Then, the eNB controller 2100, based on the MBMS service scheduling information, controls the transmitting unit 2200 to transmit MBMS data on the MBMS dedicated carrier.

In the present invention, as shown in FIG. 4B, a base station (eNB1) which generates the MBMS count result may be different from a base station (eNB2) which establishes the RB. Therefore, in the above operations, a transmitting unit of a first base station may directly deliver a generated MBMS count result via an X2 interface to a second base station in charge of establishing an RB. An eNB controller of the second base station performs subsequent operations based on the MBMS count result received by its receiving unit via the X2 interface. Or otherwise, the transmitting unit of the first base station may deliver the generated MBMS count result to an access gateway via an S1 interface, and then the access gateway delivers it to the second base station via an S1 interface. In the latter case, the first station can only work on the non-MBMS carrier, and the second station can only work on the MBMS dedicated carrier.

Figure 8:
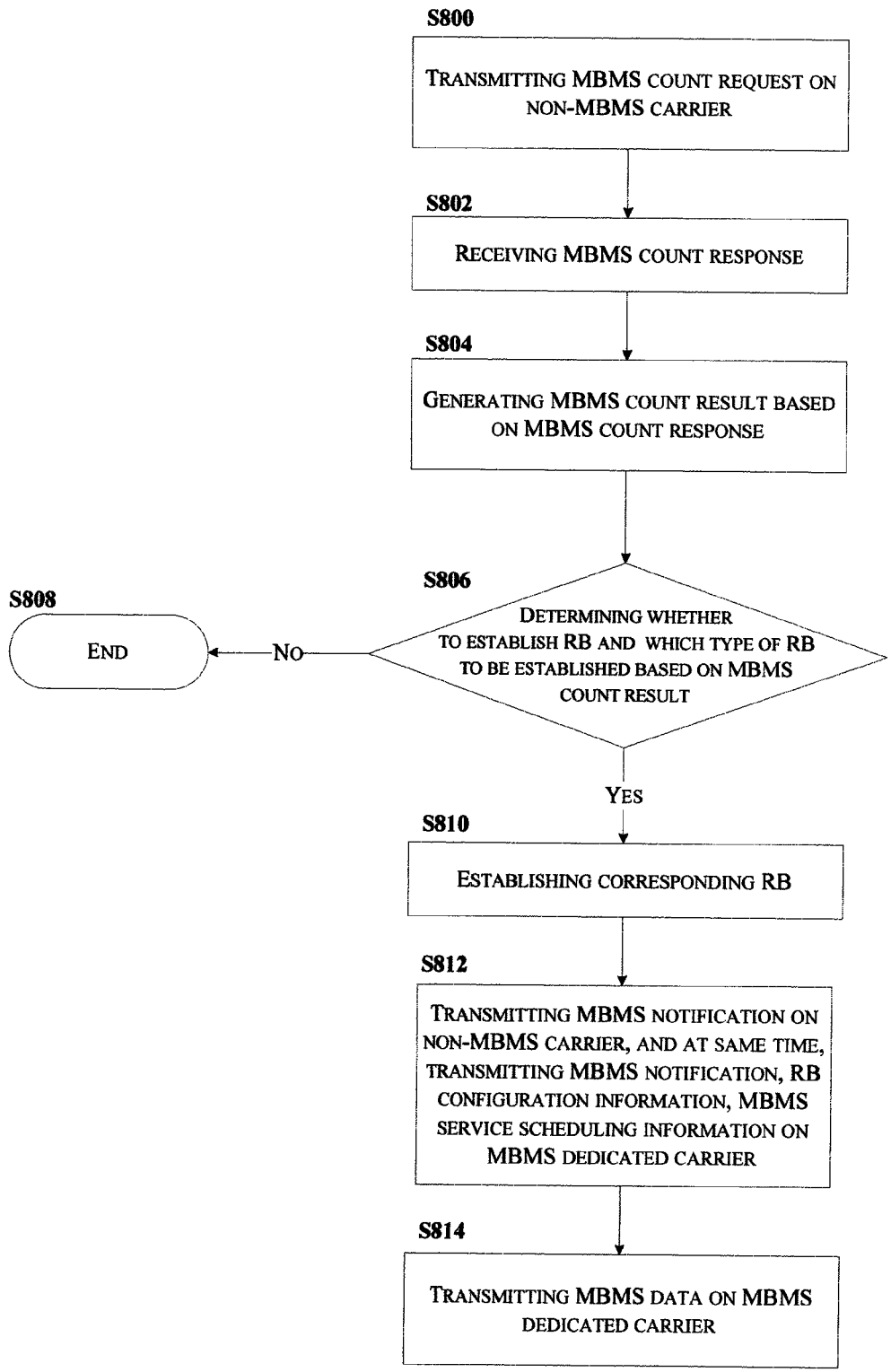
FIG. 8 is a flow chart showing operations of counting and RB establishing by an evolved base station eNB according to the present invention.

FIG. 8 is a flow chart showing operations of counting and RB establishing by an evolved base station eNB according to the present invention.

At step S800, the eNB transmits an MBMS count request on a non-MBMS carrier. After receiving the MBMS count request, a UE transmits an MBMS count response, indicating whether the UE is interested in the MBMS service. At step S802, the eNB receives the MBMS count response, and at step S804, generates an MBMS count result based on the MBMS count response. Then, at step S806, the eNB determines whether to establish an RB and which type of RB to be established based on the MBMS count result. If it is determined to establish an RB ("Yes" in step S806), the eNB establishes a corresponding RB at step S810, and carries out step S812, where the eNB transmits an MBMS notification on the non-MBMS carrier and at the same time transmits an MBMS notification, RB configuration information and MBMS service scheduling information on an MBMS dedicated carrier. After that, at step S814, the eNB transmits MBMS data on the MBMS dedicated carrier based on the MBMS service scheduling information.

If it is determined not to establish an RB ("No" in step S806), then the process is ended at step S808.

Figure 9:
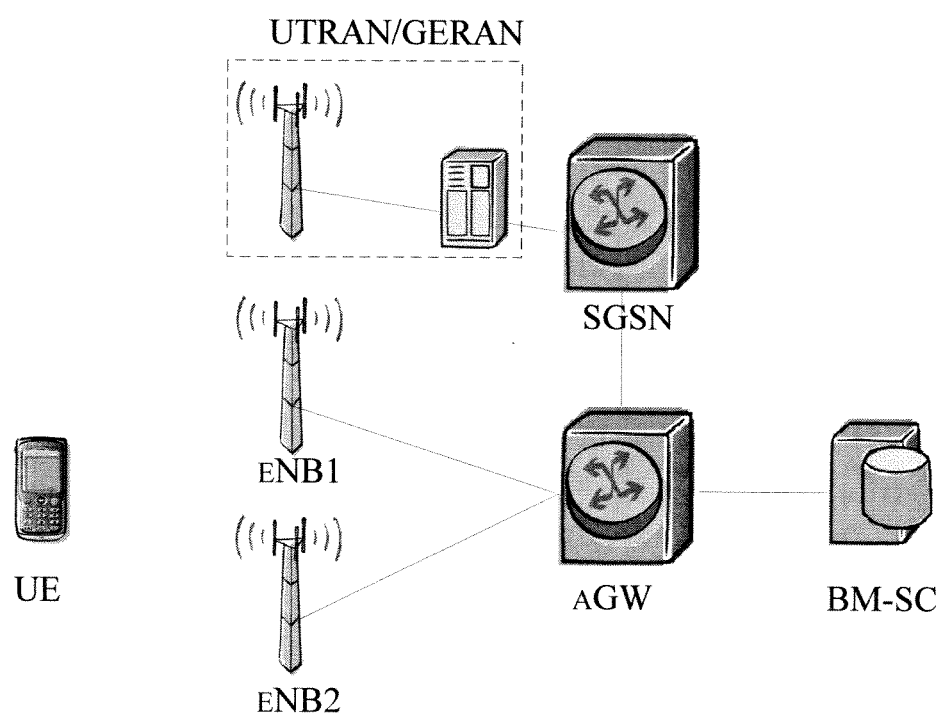
FIG. 9 is a schematic view explaining a non-MBMS carrier according to another embodiment of the invention.

In the present invention, the non-MBMS carrier may be other radio access systems such as WCDMA/GSM. As shown in FIG. 9, a radio access network of WCDMA/GSM (UTRAN/GERAN) is connected to an aGW through an SGSN (Service GPRS Supporting Node). In such network architecture, the present invention also applies, just with some slight modifications in the above described solution, without involving interactive procedures between 2 carriers such as a count procedure for a non-MBMS carrier.

By virtue of the present invention, an MBMS dedicated carrier may adopt non-paired carriers which are abundant in resources, and has a large coverage. Further, the system is simple, and can individually constitute a multimedia broadcast network. Moreover, affects on non-MBMS services are small.

It is to be noted that the above embodiments are provided just for illustration rather than limitation on the present invention. Though the present invention is described in detail with reference to the above embodiments, it is to be understood by those skilled in the art that modifications or equivalents may be made thereto. Any modifications or partial substitutions without departing from the spirit and scope of the present invention all fall into the scope defined by the appended claims.

What is claimed is:

1. A user equipment (UE), comprising:
a first receiver that is operative to receive, on a non-MBMS carrier frequency, information for determining a MBMS dedicated carrier frequency and a Multimedia Broadcast/Multicast Service (MBMS) notification;
a second receiver that is operative to receive Radio Bearer (RB) configuration information and MBMS scheduling information on the MBMS dedicated carrier frequency which is determined from the information for determining the MBMS dedicated carrier frequency; and
a controller that is operative to generate an MBMS scheduling template based on the received RB configuration information and MBMS scheduling information,
wherein, the second receiver is operative to receive MBMS data based on the MBMS scheduling template.

2. The UE according to claim 1, wherein, if a paging with respect to a non-MBMS service toward the UE is received when the second receiver is receiving the MBMS data on the MBMS dedicated carrier frequency, the controller performs prioritization on the non-MBMS service and the MBMS service; if it is determined that the non-MBMS service is of a higher priority, the controller initiates the non-MBMS service on the non-MBMS carrier frequency via the first receiver; and the second receiver continues to receive the MBMS data on the MBMS dedicated carrier frequency when the non-MBMS service is completed.

3. The UE according to claim 2, wherein, if it is determined that the MBMS service is of a higher priority, the second receiver continues to receive the MBMS data.

4. The UE according to claim 1, wherein, if an instruction of initiating a non-MBMS service is received when the second receiver is receiving the MBMS data on the MBMS dedicated carrier frequency, the controller performs prioritization on the non-MBMS service and the MBMS service; if it is determined that the non-MBMS service is of a higher priority, the controller initiates the non-MBMS service on the non-MBMS carrier frequency by via the first receiver; and the second receiver continues to receive the MBMS data on the MBMS dedicated carrier frequency when the non-MBMS service is completed.

5. The UE according to claim 4, wherein, if it is determined that the MBMS service is of a higher priority, the second receiver continues to receive the MBMS data.

6. A user equipment (UE), comprising:
a receiver for receiving, on a non-MBMS carrier frequency, information for determining a MBMS dedicated carrier frequency and a Multimedia Broadcast/Multicast Service (MBMS) notification and for receiving, on the MBMS dedicated carrier frequency, Radio Bearer (RB) configuration information and MBMS scheduling information; and
a controller that is operative to generate an MBMS scheduling template based on the received RB configuration information and MBMS scheduling information,
wherein, the receiver receives MBMS data only on the second carrier based on the MBMS scheduling template.

7. A method of receiving data for a User Equipment (UE), comprising:
Receiving, on a non-MBMS carrier frequency, information for determining a MBMS dedicated carrier frequency and a Multimedia Broadcast/Multicast Service (MBMS) notification;
receiving Radio Bearer (RB) configuration information and MBMS scheduling information on the MBMS dedicated carrier frequency determined from the information for determining the second carrier, to generate an MBMS scheduling template; and
receiving MBMS data only on the MBMS dedicated carrier frequency based on the MBMS scheduling template.

8. The method according to claim 7, further comprising:
receiving an MBMS announcement on the non-MBMS carrier frequency; and
joining an interested MBMS group on the non-MBMS carrier frequency.

9. The method according to claim 7, further comprising:
when receiving an MBMS count request on the non-MBMS carrier frequency, returning an MBMS count response.

10. The method according to claim 7, further comprising:
in a case of receiving a paging with respect to a non-MBMS service toward the UE in receiving the MBMS data on the MBMS dedicated carrier frequency, performing prioritization on the non-MBMS service and the MBMS service;
initiating the non-MBMS service on the non-MBMS carrier frequency if it is determined that the non-MBMS service is of a higher priority; and
continuing to receive the MBMS data on the MBMS dedicated carrier frequency when the non-MBMS service is completed.

11. The method according to claim 10, further comprising:
continuing to receive the MBMS data if it is determined that the MBMS service is of a higher priority.

12. The method according to claim 7, further comprising:
in a case of receiving an instruction of initiating a non-MBMS service in receiving the MBMS data on the MBMS dedicated carrier frequency, performing prioritization on the non-MBMS service and the MBMS service;
initiating the non-MBMS service on the non-MBMS carrier frequency if it is determined that the non-MBMS service is of a higher priority; and
continuing to receive the MBMS data on the MBMS dedicated carrier frequency when the non-MBMS service is completed.

13. The method according to claim 12, further comprising:
continuing to receive the MBMS data if it is determined that the MBMS service is of a higher priority.

14. A user equipment (UE), comprising:
a first receiver for receiving, on a non-MBMS carrier frequency, information for determining a MBMS dedicated carrier frequency;
a second receiver for receiving a Multimedia Broadcast/Multicast Service (MBMS) notification, Radio Bearer (RB) configuration information and MBMS scheduling information on the MBMS dedicated carrier frequency; and
a controller for generating an MBMS scheduling template based on the received RB configuration information and MBMS scheduling information,
wherein, the second receiver receives MBMS data based on the MBMS scheduling template.

15. The UE according to claim 14, wherein, if a paging with respect to a non-MBMS service toward the UE is received when the second receiver is receiving the MBMS data on the MBMS dedicated carrier frequency, the controller performs prioritization on the non-MBMS service and the MBMS service; if it is determined that the non-MBMS service is of a higher priority, the controller initiates the non-MBMS service on the non-MBMS carrier frequency via the first receiver; and the second receiver continues to receive the MBMS data on the MBMS dedicated carrier frequency when the non-MBMS service is completed.

16. The UE according to claim 15, wherein, if it is determined that the MBMS service is of a higher priority, the second receiver continues to receive the MBMS data.

17. The UE according to claim 14, wherein, if an instruction of initiating a non-MBMS service is received when the second receiver is receiving the MBMS data on the MBMS dedicated carrier frequency, the control means performs prioritization on the non-MBMS service and the MBMS service; if it is determined that the non-MBMS service is of a higher priority, the controller initiates the non-MBMS service on the non-MBMS carrier frequency by via the first receiver; and the second receiver continues to receive the MBMS data on the MBMS dedicated carrier frequency when the non-MBMS service is completed.

18. The UE according to claim 17, wherein, if it is determined that the MBMS service is of a higher priority, the second receiver continues to receive the MBMS data.

19. A user equipment (UE), comprising:
a receiver that is operative to receive, on a on-MBMS carrier frequency, information for determining a MBMS dedicated carrier frequency and for receiving, on the MBMS dedicated carrier frequency, a Multimedia Broadcast/Multicast Service (MBMS) notification, Radio Bearer (RB) configuration information and MBMS scheduling information; and
a controller that is operative to generate an MBMS scheduling template based on the received RB configuration information and MBMS scheduling information,
wherein, the receiver receives MBMS data only on the MBMS dedicated carrier frequency based on the MBMS scheduling template.

20. A method of receiving data for a User Equipment (UE), comprising:
receiving on a non-MBMS carrier frequency, information for determining a MBMS dedicated carrier frequency;
receiving a Multimedia Broadcast/Multicast Service (MBMS) notification, Radio Bearer (RB) configuration information and MBMS scheduling information on the MBMS dedicated carrier frequency determined from the information for determining the MBMS dedicated carrier frequency, to generate an MBMS scheduling template; and
receiving MBMS data only on the MBMS dedicated carrier frequency based on the MBMS scheduling template.

21. The method according to claim 20, further comprising:
receiving an MBMS announcement on the non-MBMS carrier frequency; and
joining an interested MBMS group on the non-MBMS carrier frequency.

22. The method according to claim 20, further comprising:
when receiving an MBMS count request on the non-MBMS carrier frequency, returning an MBMS count response.

23. The method according to claim 20, further comprising:
in a case of receiving a paging with respect to a non-MBMS service toward the UE in receiving the MBMS data on the MBMS dedicated carrier frequency, performing prioritization on the non-MBMS service and the MBMS service;
initiating the non-MBMS service on the non-MBMS carrier frequency if it is determined that the non-MBMS service is of a higher priority; and
continuing to receive the MBMS data on the MBMS dedicated carrier frequency when the non-MBMS service is completed.

24. The method according to claim 23, further comprising:
continuing to receive the MBMS data if it is determined that the MBMS service is of a higher priority.

25. The method according to claim 23, further comprising:
in a case of receiving an instruction of initiating a non-MBMS service in receiving the MBMS data on the MBMS dedicated carrier frequency, performing prioritization on the non-MBMS service and the MBMS service;
initiating the non-MBMS service on the non-MBMS carrier frequency if it is determined that the non-MBMS service is of a higher priority; and
continuing to receive the MBMS data on the MBMS dedicated carrier frequency when the non-MBMS service is completed.

26. The method according to claim 25, further comprising:
continuing to receive the MBMS data if it is determined that the MBMS service is of a higher priority.

27. A base station, comprising:
a first transmitter that is operative to transmit on a non-MBMS carrier frequency information for determining a MBMS dedicated carrier frequency and a Multimedia Broadcast/Multicast Service (MBMS) notification; and
a second transmitter that is operative to transmit an MBMS notification, Radio Bearer (RB) configuration information and MBMS scheduling information on the MBMS dedicated carrier frequency,
wherein, the second transmitter transmits MBMS data based on the RB configuration information and the MBMS scheduling information.

28. The base station according to claim 27, wherein, if a call toward a user equipment (UE) which is receiving the MBMS data is made when the second transmitter is transmitting the MBMS data on the MBMS dedicated carrier frequency, only the first transmitter transmits a paging toward the UE on the non-MBMS carrier frequency.

29. The base station according to claim 27, wherein, if a call toward a user equipment (UE) which is receiving the MBMS data is made when the second transmitter is transmitting the MBMS data on the MBMS dedicated carrier frequency, the first transmitter and the second transmitter transmit a paging toward the UE on the non-MBMS carrier frequency and the MBMS dedicated carrier frequency respectively.

30. A base station, comprising:
for a transmitter that is operative to transmit, on a non-MBMS carrier frequency, information for determining a MBMS dedicated carrier frequency and a Multimedia Broadcast/Multicast Service (MBMS) notification, and operative to transmit an MBMS notification, Radio Bearer (RB) configuration information and MBMS scheduling information on the MBMS dedicated carrier frequency,
wherein, the transmitter transmits MBMS data only on the MBMS dedicated carrier frequency based on the RB configuration information and the MBMS scheduling information.

31. A method of transmitting data for a base station, comprising:
Transmitting, on a non-MBMS carrier frequency, information for determining a MBMS dedicated carrier frequency and a Multimedia Broadcast/Multicast Service (MBMS) notification;

transmitting an MBMS notification, Radio Bearer (RB) configuration information and MBMS scheduling information on the MBMS dedicated carrier frequency; and transmitting MBMS data based on the RB configuration information and the MBMS scheduling information only on the MBMS dedicated carrier frequency.

32. The method according to claim 31, further comprising: transmitting an MBMS announcement on the non-MBMS carrier frequency.

33. The method according to claim 31, further comprising: transmitting an MBMS count request on the non-MBMS carrier frequency.

34. The method according to claim 31, wherein, if a call toward a user equipment (UE) which is receiving the MBMS data is made when the MBMS data are being transmitted on the MBMS dedicated carrier frequency, a paging toward the UE is transmitted only on the non-MBMS carrier frequency.

35. The method according to claim 31, wherein, if a call toward a user equipment (UE) which is receiving the MBMS data is made when the MBMS data are being transmitted on the MBMS dedicated carrier frequency, a paging toward the UE is transmitted on the non-MBMS carrier frequency and the MBMS dedicated carrier frequency.

* * * * *